US012591063B2

(12) United States Patent
Beuschel

(10) Patent No.: US 12,591,063 B2
(45) Date of Patent: Mar. 31, 2026

(54) READING DEVICE AND LIDAR MEASURING DEVICE

(71) Applicant: Microvision, Inc., Redmond, WA (US)

(72) Inventor: Ralf Beuschel, Wangen (DE)

(73) Assignee: Microvision, Inc., Redmond, WA (US)

( * ) Notice: Subject to any disclaimer, the term of this patent is extended or adjusted under 35 U.S.C. 154(b) by 1125 days.

(21) Appl. No.: 17/621,911

(22) PCT Filed: Jun. 25, 2020

(86) PCT No.: PCT/EP2020/067886
§ 371 (c)(1),
(2) Date: Dec. 22, 2021

(87) PCT Pub. No.: WO2021/001261
PCT Pub. Date: Jan. 7, 2021

(65) Prior Publication Data
US 2022/0244396 A1 Aug. 4, 2022

(30) Foreign Application Priority Data
Jul. 2, 2019 (DE) ..................... 10 2019 209 698.0

(51) Int. Cl.
*G01S 17/931* (2020.01)
*G01S 7/481* (2006.01)
(Continued)

(52) U.S. Cl.
CPC .......... *G01S 17/931* (2020.01); *G01S 7/4815* (2013.01); *G01S 7/4865* (2013.01); *G01S 7/497* (2013.01)

(58) Field of Classification Search
CPC ...... G01S 7/497; G01S 7/4865; G01S 7/4815; G01S 7/4915; G01S 17/931; G01S 7/4918; G01S 7/487
See application file for complete search history.

(56) References Cited

U.S. PATENT DOCUMENTS

2012/0236290 A1* 9/2012 Eisele ..................... G01S 7/497
356/6
2017/0212042 A1 7/2017 Angelosante
(Continued)

FOREIGN PATENT DOCUMENTS

CN 109507680 3/2019
DE 10 2017 222 969 A1 6/2019
(Continued)

OTHER PUBLICATIONS

"German search report for App No. 102019209698.0 dated Feb. 13, 2020".

*Primary Examiner* — Yuqing Xiao
*Assistant Examiner* — Isabelle Lin Boegholm
(74) *Attorney, Agent, or Firm* — Kevin D. Wills

(57) ABSTRACT

The present invention relates to a reading device for determining a signal propagation time of a light pulse between a lidar transmission unit and a lidar receiving unit of a lidar measuring device in a focal plane array arrangement, comprising: an input interface for receiving detections from multiple sensor elements of the lidar receiving unit, said sensor elements being arranged in a macrocell paired with a transmission element of the lidar transmission unit; a weighting unit for determining a respective individual weighting parameter for each of the plurality of sensor elements, said weighting parameter being based on a signal-to-noise ratio of the sensor element; a summation unit for generating a histogram with an allocation of the detections to the detection times of the detections, said summation unit being configured to weight the detections on the basis of the individual weighting parameters; a propagation time unit for determining the signal propagation time on the basis of the generated histogram; and an output unit for outputting the signal propagation time. The invention additionally relates to a method for determining a signal propagation time and
(Continued)

Figure 1:
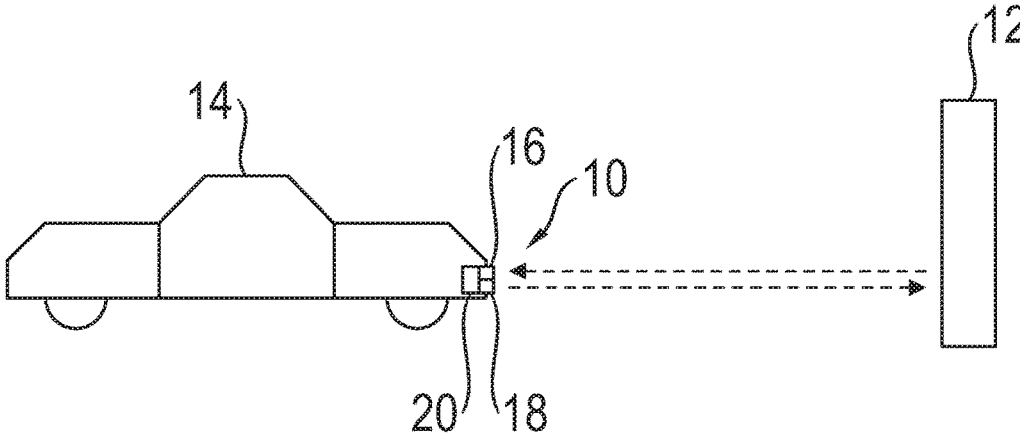

to a lidar measuring device in a focal plane array arrangement for detecting objects in a surroundings of a vehicle.

20 Claims, 3 Drawing Sheets

(51) Int. Cl.
    *G01S 7/4865*       (2020.01)
    *G01S 7/497*       (2006.01)

(56)           References Cited

U.S. PATENT DOCUMENTS

| | | | |
|---|---|---|---|
| 2019/0056497 A1* | 2/2019 | Pacala | G01S 7/497 |
| 2020/0249354 A1* | 8/2020 | Yeruhami | G01S 7/4817 |
| 2021/0389462 A1* | 12/2021 | Wang | G01S 17/89 |

FOREIGN PATENT DOCUMENTS

| | | |
|---|---|---|
| DE | 10 2017 223 102 A1 | 9/2019 |
| JP | 05-249218 | 9/1993 |
| JP | 2018-136309 A | 8/2018 |
| WO | 2018160886 | 9/2018 |
| WO | 2019115148 A1 | 6/2019 |
| WO | WO20190121437 | 6/2019 |

\* cited by examiner

READING DEVICE AND LIDAR MEASURING DEVICE

The present invention relates to a reading device for determining a signal propagation time of a light pulse between a lidar transmission unit and a lidar receiving unit of a lidar measuring device in a focal plane array arrangement. The present invention additionally relates to a method for determining a signal propagation time and to a lidar measuring device.

Modern vehicles (cars, transporters, trucks, motorcycles, driverless transport systems etc.) comprise a plurality of systems which provide information to a driver or respectively to an operator and/or control individual functions of the vehicle in a partially or fully automated manner. The surroundings of the vehicle and, if applicable, other road users, are detected by means of sensors. On the basis of the detected data, a model of the vehicle environment can be generated and reactions to changes in this vehicle environment can be carried out. Through the advancing development in the field of autonomously and partially autonomously travelling vehicles, the influence and sphere of activity of driver assistance systems (Advanced Driver Assistance Systems, ADAS) and autonomously operating transport systems is becoming ever greater. Through the development of ever more precise sensors, it is possible to detect the environment and to control individual functions of the vehicle entirely or partially without intervention by the driver.

An important sensor principle here for the detection of the environment is lidar technology (light detection and ranging). A lidar sensor is based on the transmission of light pulses and the detection of the reflected light. By means of a propagation time measurement, a distance to the site of the reflection can be calculated. Through an evaluation of the received reflections, a detection of a destination can take place. With regard to the technical realization of the corresponding sensor, a differentiation is made between scanning systems, which generally function on the basis of micromirrors, and non-scanning systems, in which a plurality of transmission and receiving elements are arranged lying statically adjacent to one another (in particular so-called focal plane array arrangement).

In this context, in WO 2017/081294 a method and a device for optical distance measurement are described. A use of a transmission matrix is disclosed for the transmitting of measurement pulses, and of a receiving matrix for receiving the measurement pulses. In the transmitting of the measurement pulses, subsets of the transmission elements of the transmission matrix are activated.

A challenge in the detection of objects by means of such a lidar measuring device in focal plane array arrangement lies in the limited transmission power. The power emitted via the transmission elements of the lidar transmission unit is restricted owing to the limited chip size and the heating of the chip. The increase of the power is associated with an increase in manufacturing effort and high costs. This causes a range limitation and a restriction in the reliability in the detection of objects, in particular in the long-distance range of the lidar sensor.

Proceeding herefrom, the present invention sets itself the task of providing an approach for the detection of objects in a field of view of a lidar measuring device. In particular the range and/or the reliability in the detection of objects is to be increased with a consistent manufacturing effort. A lidar sensor is to be created which is able to be realized at a favourable cost and is energy-efficient.

To solve this problem the invention relates, in a first aspect, to a reading device for determining a signal propagation time of a light pulse between a lidar transmission unit and a lidar receiving unit of a lidar measuring device in a focal plane array arrangement, comprising:

an input interface for receiving detections from multiple sensor elements of the lidar receiving unit, said sensor arrangements being arranged in a macrocell paired with a transmission element of the lidar transmission unit;

a weighting unit for determining a respective individual weighting parameter for each of the plurality of sensor elements, said weighting parameter being based on a signal-to-noise ratio of the sensor element;

a summation unit for generating a histogram with an allocation of the detections to detection times of the detections, said summation unit being configured to weight the detections based on the individual weighting parameters;

a propagation time unit for determining the signal propagation time on the basis of the generated histogram; and an output unit for outputting the signal propagation time.

In a further aspect, the present invention relates to a lidar measuring device in a focal plane array arrangement for detecting objects in an environment of a vehicle, comprising:

a lidar transmission unit with a plurality of transmission elements for transmitting light pulses and with a lidar receiving unit with a plurality of sensor elements for receiving the light pulses, wherein the transmission elements and the sensor elements are arranged in lines which run parallel to a horizontal plane of the vehicle; and a reading device as previously described.

Further aspects of the invention relate to a method, configured according to the reading device and a computer program product with program code for carrying out the steps of the method, when the program code is executed on a computer, and a storage medium on which a computer program is stored which, when it is executed on a computer, brings about an execution of the method described herein.

Preferred embodiments of the invention are described in the dependent claims. It shall be understood that the features mentioned above and to be explained further below are able to be used not only in the respectively indicated combination, but also in other combinations or in isolation, without departing from the scope of the present invention. In particular, the reading device, the lidar measuring device and the method and the computer program product can be configured in accordance with the embodiments described for the reading device or respectively the lidar measuring device in the dependent claims.

According to the invention, provision is made that on uniting the detections of the individual sensor elements of a lidar receiving unit, several of which are assigned in a macrocell to a transmission element of the lidar transmission element, a weighting is carried out. The weighting is based here on a signal-to-noise ratio of the individual sensor element. In particular, sensor elements which have a high signal-to-noise ratio are more heavily weighted than other sensor elements. The weighting is in this respect selected depending on how much power the individual sensor element receives. The approach according to the invention corresponds to a maximum ratio combining approach, as is known from communications technology for receiving with several antennae. The maximum ratio combining method is applied to a lidar system. The weighting of the signals of the individual sensor elements can be selected here for example proportional to a root mean square (RMS) of the signal level and/or inverse-proportional to a noise component of the signal. The weighting factors are determined individually for each reception path, therefore for each sensor element.

Compared to previous approaches, in which all sensor elements assigned to a transmission element are considered in an identical manner, the measuring accuracy can be improved. A greater range or respectively a greater reliability in the detection of objects is produced. Compared to approaches in which individual sensor elements are switched off completely, the choice of weighting parameters as a function of a signal-to-noise ratio of the respective sensor element brings about an improved detection. Reception paths with poor reception are also used, in order to improve the overall signal. In certain circumstances, methods in which active sensor elements are selected are not optimal in the case of intense ambient light. According to the invention, an improved detection of objects is achieved.

In a preferred embodiment, the weighting unit is configured for determining the individual weighting parameters based on a calibration measurement of a spot position on the macrocell. Sensor elements with increasing distance from a centre point of the spot position receive a lower weighting. Preferably, sensor elements outside the spot position receive a weighting of 0. A calibration measurement corresponds here in particular to a calibration on putting into service and/or on production of the lidar measuring device. Through manufacturing tolerances and material deviations, a spot position (a representation position of a transmission element) on the lidar receiving unit or respectively on the multiple sensor elements of a microcell varies. This circumstance is usually taken into account in that the macrocell is configured to be greater than the spot position. In a calibration measurement, a spot position can be measured and the individual weighting parameters can be established based on this calibration. The individual weighting parameters therefore no longer change to the propagation time, but rather are predetermined for a lidar measuring device. A method results which is able to be implemented efficiently for determining the individual weighting parameters.

In a preferred embodiment, the weighting unit is configured for determining the individual weighting parameters based on a sequential individual calibration reading of the sensor elements with unchanged signal propagation time. Sensor elements with a higher number of detections in the calibration reading receive a higher weighting. Preferably, sensor elements with a number of detections in the calibration reading below a threshold value receive a weighting of 0. The calibration reading corresponds in this respect to an activating of individual sensor elements in succession with constant signal propagation time or respectively spot position. For each sensor element, a check is carried out separately as to which signal component can be received. A method is produced which is able to be realized efficiently, in order to determine the individual weighting parameters before putting into service.

In a preferred embodiment, the weighting unit is configured for determining the individual weighting parameters based on an individual noise parameter of the sensor element, which describes a signal noise of the sensor element. Preferably, the weighting unit is configured for determining the individual noise parameter based on a previous propagation time measurement and/or based on a preceding ambient light measurement. The noise is determined separately for each sensor element. Hereby, manufacturing differences can be compensated. For example, an ambient light measurement can be carried out at regular intervals, wherein it is assumed that the ambient light is identical for all sensor elements. According to the signal of the individual sensor element, an individual influencing of the sensor element by the ambient light can then be determined. An efficient possibility to determine a noise component is produced.

In a preferred embodiment, the weighting unit is configured for the determining of individual weighting parameters with whole-numbered weighting factors. The summation unit is configured for generating the histogram based on a multiple counting of detections according to the whole-numbered weighting factors. The whole-numbered weighting factors are preferably powers of two. Hereby, an efficient implementability is achieved. Whole-numbered weighting parameters can enable a weighting with comparatively little hardware expenditure. Particularly advantageously, powers of two are used. A cost-efficient implementability is produced.

In a preferred embodiment, the weighting unit is configured for the determining of individual weighting parameters with whole-numbered counting factors. The summation unit is configured for generating the histogram based on an exclusive counting of detections, which correspond to a multiple of the respective counting factor of the sensor element, and for the rejecting of the other detections. The whole-numbered counting factors are preferably powers of two. There results likewise an efficient implementability of the weighting approach in hardware. The weighting takes place by rejecting events of individual sensor elements with a low signal-to-noise ratio. Detections or respectively events of such sensor elements are rejected. The rejecting can be realized here by simple counters. An efficient implementability and a high performance are produced.

In a preferred embodiment, the weighting unit is configured for generating respectively a partial histogram for each sensor element. The weighting unit is configured for determining the individual weighting parameters based on an evaluation of the partial histograms. The summation unit is configured for generating the histogram based on a summation of the partial histograms which is weighted with the individual weighting parameters. An individual histogram is generated for each sensor element. The weighting factors can be determined by means of the noise level. The partial histograms can be added in a weighted manner, wherein each histogram bin of the partial histogram is added with a weighting factor to an overall histogram. A comparatively high effort indeed results for the calculation of the individual histograms. However, it is possible to establish the weighting factors as a follow-up to a measurement respectively optimally for each sensor element. An establishing of the weighting factors to the propagation time is produced. An adaptation to current conditions is achieved.

The respective weighting factor is preferably identical for all detections, in particular with regard to all bins, of a sensor element, because this concerns an individual weighting factor of the corresponding sensor element which relates to all detections. No individual weighting parameters are assigned to the individual bins of a partial histogram.

In a preferred embodiment, the lidar measuring device is configured for carrying out a Time Correlated Single Photo Counting, TCSPC, measuring method. Preferably, the lidar measuring device is operated on the basis of a TCSPC measuring method. Individual photon events are counted (detections).

In a preferred embodiment, the lidar measuring device is designed for arranging on a vehicle in a region on the bumper of the vehicle. A free view results onto objects in front of or respectively behind the vehicle. A good detection of objects in the environment of the vehicle is achieved.

A focal plane array arrangement is understood to mean a configuration of the sensor elements (or respectively of the transmission elements) substantially in a plane. A lidar receiving unit is, in particular, a microchip with corresponding sensor elements. A lidar transmission element is likewise in particular a microchip with corresponding transmission elements. The receiving- and transmission unit can be arranged jointly on a microchip. The transmission and sensor elements are, for example, arranged respectively on a chip in matrix form and are distributed over an area of the chip. One or more sensor elements are assigned to a transmission element. A light pulse of a lidar transmission unit is understood to mean in particular a pulse of laser light. A signal propagation time describes in particular the period of time which a light pulse requires, which is transmitted by the lidar transmission unit and after a reflection on an object in the environment of the lidar measuring device is received by the lidar receiving unit. A detection describes in particular an impingement of a photon on a sensor element. A signal propagation time can be determined in particular on the basis of a high point detection in the generated histogram. An environment of a vehicle comprises in particular a region visible from the vehicle in the surroundings of the vehicle.

Figure 2:
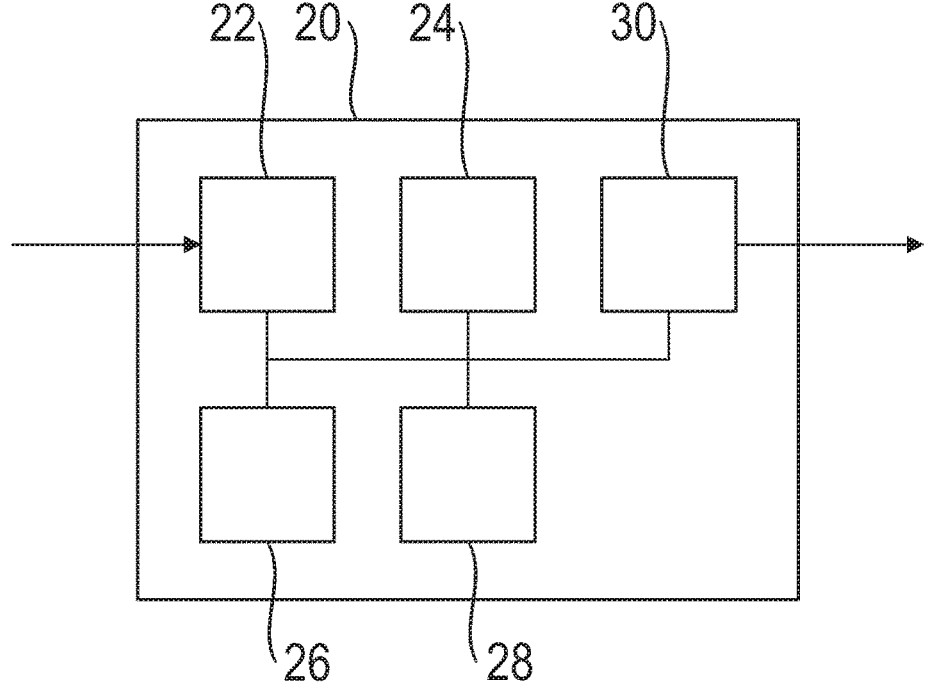
Figure 3:
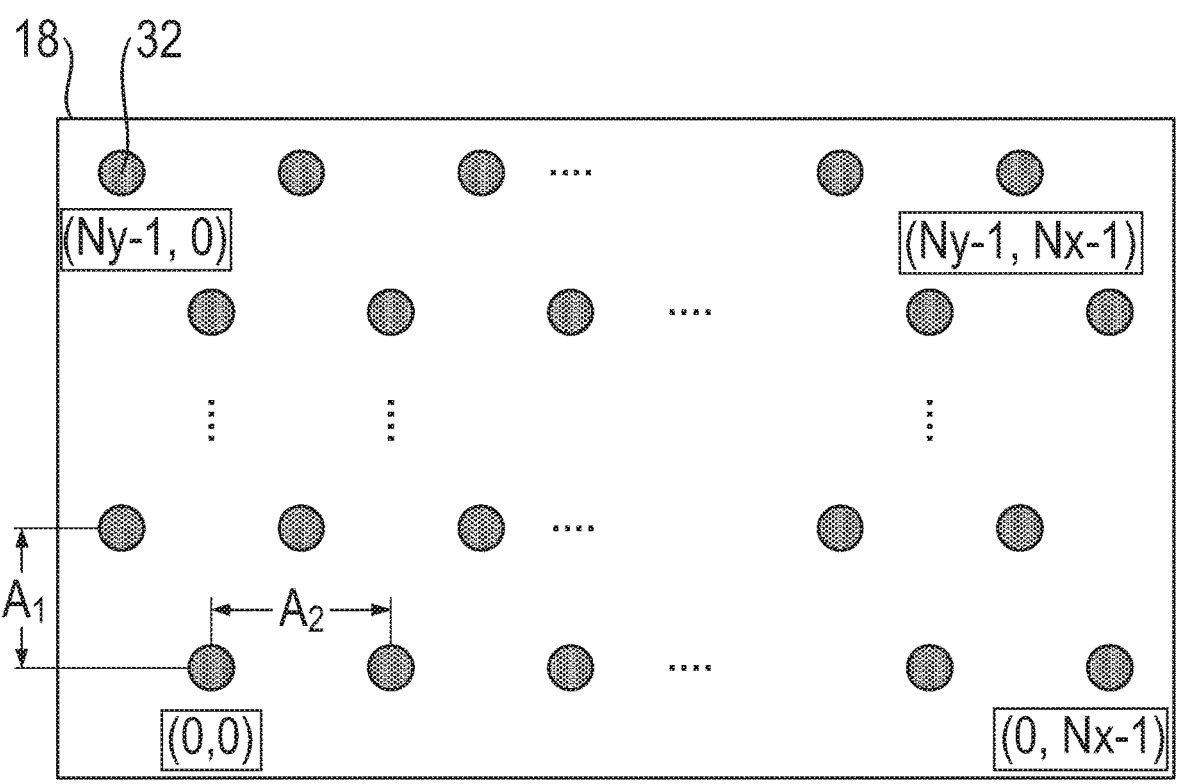
Figure 4:
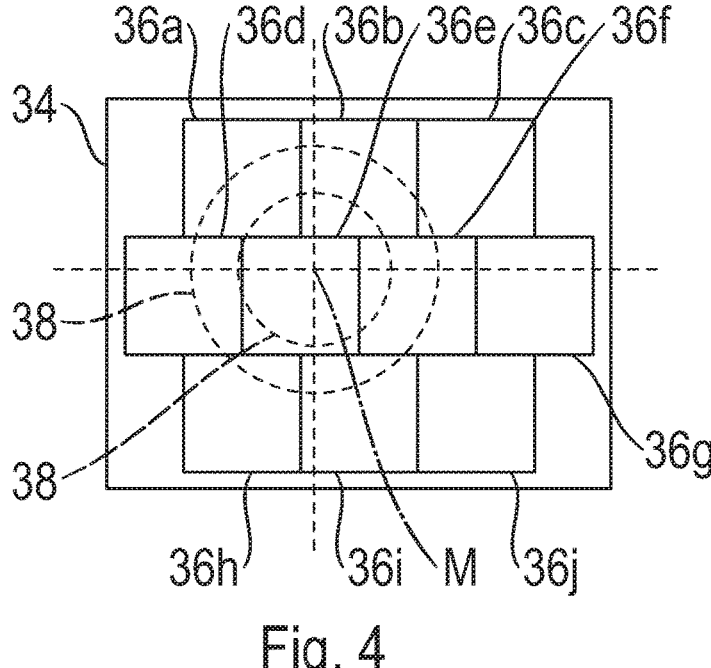

The invention is described and explained more closely below with the aid of some selected example embodiments in connection with the attached drawings. There are shown:

FIG. 1 a schematic illustration of a lidar measuring device according to an aspect of the present invention;

FIG. 2 a schematic illustration of a reading device according to the invention;

FIG. 3 a schematic illustration of a lidar transmission unit for the transmitting of light pulses;

FIG. 4 a schematic illustration of a macrocell of the lidar receiving unit; and

Figure 5:
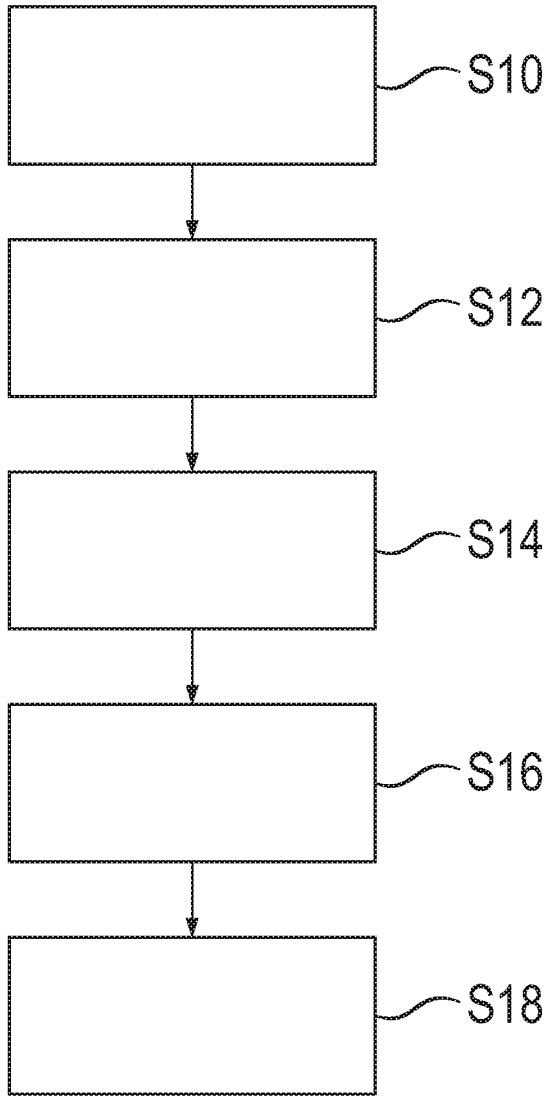

FIG. 5 a schematic illustration of a method according to the invention.

In FIG. 1 a lidar measuring device 10 according to the invention for detecting an object 12 in an environment of a vehicle 14 is illustrated schematically. In the illustrated example embodiment, the lidar measuring device 10 is integrated into the vehicle 14. The object 12 in the environment of the vehicle 14 can be, for example, another vehicle or also a static object (traffic sign, house, tree etc.) or respectively another road user (pedestrian, cyclist etc.). The lidar measuring device 10 is preferably mounted in the region of a bumper of the vehicle 14 and can in particular evaluate the environment of the vehicle 14 in front of the vehicle. For example, the lidar measuring device 10 can be integrated into the front bumper.

The lidar measuring device 10 according to the invention comprises a lidar receiving unit 16 and a lidar transmission unit 18. Furthermore, the lidar measuring device 10 comprises a reading device 20 for adapting a field of view of the lidar measuring device 10.

Preferably both the lidar receiving unit 16 and also the lidar transmission unit 17 are designed in focal plane array configuration. The elements of the respective device are arranged substantially in a plane on a corresponding chip. The chip of the lidar receiving unit or respectively of the lidar transmission unit is arranged in a focal point of corresponding optics (transmission optics or receiving optics). In particular, sensor elements of the lidar receiving unit 16 or respectively transmission elements of the lidar transmission unit 18 are arranged in the focal point of the respective receiving- or respectively transmission optics. These optics can be configured for example by an optical lens system.

The sensor elements of the lidar receiving unit 16 are preferably configured as a SPAD (Single Photon Avalanche Diode). The lidar transmission unit 18 comprises a plurality of transmission elements for the transmitting of laser light or respectively laser pulses. The transmission elements are preferably configured as VCSEL (Vertical Cavity Surface Emitting Laser). The transmission elements of the lidar transmission unit 18 are distributed over an area of a transmission chip. The sensor elements of the lidar receiving unit 16 are distributed over an area of the receiving chip.

Transmission optics are assigned to the transmission chip, receiving optics are assigned to the receiving chip. The optics represent a light from a spatial region arriving onto the respective chip. The spatial region corresponds to the viewing range of the lidar measuring device 10, which is examined or respectively sensed for objects 12. The spatial region of the lidar receiving unit 16 or respectively of the lidar transmission unit 18 is substantially identical. The transmission optics represent a transmission element to a solid angle which represents a partial region of the spatial region. The transmission element transmits accordingly laser light into this solid angle. The transmission elements jointly cover the entire spatial region. The receiving optics represent a sensor element to a solid angle which constitutes a partial region of the spatial region. The number of all the sensor elements covers the entire spatial region. Transmission elements and sensor elements which consider the same solid angle map to one another and are accordingly assigned or respectively paired with one another. A laser light of a transmission element normally always presents to the associated sensor element. Favourably, several sensor elements are arranged within the solid angle of a transmission element.

For the determining or respectively detection of objects 12 within the spatial region, the lidar measuring device 10 carries out a measuring process. Such a measuring process comprises one or more measuring cycles, according to the structural design of the measuring system and its electronics. Preferably here in the reading device 20 a TCSPC method (Time Correlated Single Counting method) is used. Here, individual impinging photons are detected, in particular by a SPAD, and the time of the activation of the sensor element (detection time) is deposited in a storage element. The detection time is in relation to a reference time at which the laser light is transmitted. From the difference, the propagation time of the laser light can be ascertained, from which the distance of the object 12 can be determined.

A sensor element of the lidar receiving unit 16 can be activated on the one hand by the laser light and on the other hand by ambient radiation. A laser light at a particular distance of the object 12 always impinges at the same time, whereas the ambient radiation at any time provides the same likelihood of activating a sensor element. With the multiple carrying out of a measurement, in particular of several measuring cycles, the activations of the sensor element add up at the detection time which corresponds to the propagation time of the laser light with respect to the distance of the object. By comparison, the activations through the ambient radiation are distributed uniformly over the measurement duration of a measuring cycle. A measurement corresponds to the transmitting and subsequent detecting of the laser light. The data of the individual measuring cycles of a measuring process which are deposited in the storage element enable an evaluation of the multiply determined detection times, in order to deduce the distance of the object 12.

A sensor element is favourably connected with a TDC (Time to Digital Converter). The TDC deposits in the storage element the time of activating of the sensor element. Such a storage element can be configured for example as a short-term memory or as a long-term memory. For a measuring process, the TDC fills a storage element with the times at which the sensor elements detect an impinging photon. This can be represented graphically by a histogram which is based on the data of the storage element. In a histogram the duration of a measuring cycle is divided into very short time segments (so-called bins). When a sensor element is activated, the TDC increases the value of a bin by 1. The bin is filled which corresponds to the propagation time of the laser pulse, therefore the difference between detection time and reference time.

In FIG. 2 a reading device 20 according to the invention for determining a signal propagation time of a light pulse is illustrated schematically. The reading device 20 comprises an input interface 22, a weighting unit 24, a summation unit 26, a propagation time unit 28 and an output unit 30. The various units and interfaces can be embodied or respectively implemented individually or in a combined manner in software and/or in hardware. In particular, the units can be implemented in software which is embodied on a processor of the lidar measuring device.

Detections of several sensor elements of the lidar receiving unit are received via the input interface 22. In particular, detections are received of a macrocell with several sensor elements. A detection can correspond here in particular to a time of an impinging photon in the sensor element. The detections result here on the one hand owing to registered ambient light (noise) and on the other hand owing to reflected light pulses of the lidar transmission unit on an object.

In the weighting unit 24 for each individual sensor element an individual weighting parameter is determined. This weighting parameter indicates in particular how intensively this sensor element is to be taken into consideration in the generating of the histogram for the macrocell or respectively for the measurement. The weighting unit 24 can be configured here both for determining the individual weighting parameters at the propagation time, therefore during the operation of the lidar measuring device, and also for the one-time ascertaining of the weighting parameters before putting into service.

Basically, it is proposed according to the invention to use a maximal ratio combining for several sensor elements which are jointly assigned to a transmission element. The weighting unit 24 is configured here for determining the individual weighting parameters, wherein these weighting parameters depend on the signal-to-noise ratio of the individual sensor elements. In particular, a weighting can be used proportionally to the root mean square of the signal level and inverse-proportionally to the noise level. In the weighting unit 24 the weighting factors are determined individually for each reception path, therefore for each sensor element.

For determining the weighting parameters it is possible, on the one hand, that the signal strength in the far field (root square) is determined for all sensor elements of the macrocell in a calibration phase. For this, a measuring of a spot position can be carried out in a factory calibration. In addition, it is possible to activate individual sensor elements in order to be able to determine successively respectively their signal-to-noise ratio. Basically, the noise level is dependent on the ambient light and can be determined respectively for example before the transmitting of a laser pulse. The sensor elements within the spot far field positions are added up in a weighted manner. The sensor elements outside the spot positions can be switched off.

In the summation unit 26 a histogram is generated with an allocation of the detections to detection times of the detections. The summation of the sensor elements or respectively of the detections of the sensor elements is event-based. Each sensor element generates, on the detection of a photon, a binary output signal. The time of impinging is determined and recorded in a histogram. On the generating of the histogram, the previously determined individual weighting parameters are taken into consideration.

In particular, it is possible that all detections are stored directly in a shared histogram. Here, the weighting can take place in particular on the basis of whole-number weighting factors. A detection of a sensor element with a high signal-to-noise ratio can generate for example an increment of 4 in the corresponding bin of the histogram (weighting factor 4). A detection in a sensor element with medium signal-to-noise ratio can generate an increment of 2 in the corresponding bin of the histogram (weighting factor 2). A detection in a sensor element with low signal-to-noise ratio can generate for example an increment of 1 in the corresponding bin of the histogram (weighting factor 1). Sensor elements which lie outside the spot position can be rejected, for example.

Alternatively hereto, it is possible that the weighting is carried out by rejecting of detections of sensor elements with a low signal-to-noise ratio. A rejecting of individual detections can be realized by simple counters or respectively on the basis of a counting factor, which indicates which detections are to be rejected. For example, a sensor element with a high signal-to-noise ratio can activate at each event an increment of the corresponding bin of the histogram (counting factor 1). A sensor element with a medium signal-to-noise ratio can activate for example at every other detection an increment of the corresponding bin of the histogram (counting factor 2). A sensor element with a low signal-to-noise ratio can generate for example at every fourth event an increment of 1 in the corresponding bin of the histogram (counting factor 4).

The use of whole-number counting factors and weighting factors, in particular powers of two, are able to be realized particularly advantageously in terms of hardware. The use of a counting factor is able to be implemented here even more efficiently, however has where applicable a poorer performance, because detections of sensor elements with high signal-to-noise ratios are rejected and are not taken into consideration.

Likewise it is possible to generate the histogram in such a way that several partial histograms, which were created respectively separately for each sensor element, are added. A weighting of the contents of the bins of the histograms on the basis of the weighting parameters can be carried out.

In the propagation time unit 28 a signal propagation time is determined on the basis of the generated histogram. For this, in particular a high point of the histogram can be detected. The high point corresponds to the time of the highest signal strength and hence to the location of the reflection of the light pulse at an object.

The determined signal propagation time is outputted via the output unit 30. In particular an object localisation can then take place.

In FIG. 3 the structure of the lidar transmission unit 13 is illustrated schematically. The chip comprises several transmission elements 32 which are arranged in an array (matrix). For example, several thousand transmission elements can be used. The transmission elements 32 are preferably activated line by line. For better clarity, only one transmission element 32 is provided with a reference number.

In the illustrated example embodiment, the lines 0 . . . ny–1 comprise respectively a plurality of transmission elements 0 . . . nx–1. For example, 100 lines (ny=100) and 128 transmission elements per line (nx=128) can be provided. The line spacing A1 between the lines can lie in the region of a few micrometres, for example 40 μm. The element spacing A2 between transmission elements 32 in the same line can lie in a similar order of magnitude.

In FIG. 4 a macrocell 34 with a total of 10 sensor elements 36a-36j is illustrated schematically. In addition, the spot position 38, therefore the position of a spot which corresponds to the transmission element of the lidar transmission unit, is illustrated schematically. The spot usually has here an at least approximately gaussian spot profile. In the illustration in FIG. 4, by the two concentric circles of the spot position 38 it is indicated how the signal strength reduces outwards within this spot profile. As illustrated, the centre point of the spot is in the sensor element 36e and hence outside a centre point of the macrocell 34. The sensor element 36e will accordingly have the highest signal component. According to the invention, through the individual weighting factors, which are respectively assigned to the transmission elements 36a-36j, it is established how heavily these sensor elements are weighted in the generating of the histogram. In the illustrated example, it is conceivable that the sensor elements 36g and 36j are taken into consideration with a weight of 0 and are not included in the ascertaining of the histogram. The sensor element 36e can be weighted four times, the sensor elements 36a, 36b and 36 can be weighted double, the remaining sensor elements can be weighted onefold. The illustration of FIG. 4 and the weightings indicated above are to be understood here by way of example. It shall be understood that other numbers of sensor elements can be arranged in a microcell and other weightings can be used.

In FIG. 5 a method according to the invention is illustrated schematically. The method comprises steps of the receiving S10 of detections, of the determining S12 respectively of an individual weighting parameter, of the generating S14 of a histogram, of the determining S16 of a signal propagation time and of the outputting S18 of the signal propagation time. The method can be implemented for example in software which is executed on a processor of a lidar measuring device.

The invention was described and explained comprehensively with the aid of the drawings and the description. The description and explanation are to be understood as an example and not restrictive. The invention is not restricted to the disclosed embodiments. Other embodiments or variations will emerge for the specialist in the art in the application of the present invention and in a precise analysis of the drawings, of the disclosure and of the following claims.

In the claims, the words "comprise" and "with" do not rule out the presence of further elements or steps. The indefinite article "a" or "an" does not rule out the presence of a plurality. An individual element or an individual unit can carry out the functions of several of the units named in the claims. An element, a unit, an interface, a device and a system can be implemented partially or completely in hardware and/or in software. The mere naming of some provisions in several different dependent claims is not to be understood to the effect that a combination of these provisions can not likewise be advantageously used. Reference numbers in the claims are not to be understood in a restricting manner.

The invention claimed is:

1. A reading device for determining a signal propagation time of a light pulse between a lidar transmission unit and a lidar receiving unit of a lidar measuring device in a focal plane array arrangement, comprising:

an input interface for receiving detections from multiple sensor elements of the lidar receiving unit, said sensor elements being arranged in a macrocell paired with a transmission element of the lidar transmission unit;

a weighting unit for determining respectively an individual weighting parameter for each of the multiple sensor elements, wherein the individual weighting parameter is generated during a factory calibration procedure that includes, for each sensor element: sequentially activating the sensor element while a constant signal propagation time is imposed, counting a number of detections registered by the sensor element, and assigning to the sensor element a whole-number weighting factor that is a power of two, proportional to a counted number of detections, and set to zero if the count is below a predetermined threshold, such that the weighting parameter depends on an individually measured signal-to-noise ratio of each sensor element;

a summation unit for generating a histogram with an allocation of the detections to detection times of the detections, wherein the summation unit is configured to weight the detections on a basis of the individual weighting parameters;

a propagation time unit for determining the signal propagation time on a basis of the generated histogram; and an output unit for outputting the signal propagation time.

2. The reading device according to claim 1, wherein the weighting unit is configured for determining the individual weighing parameters on a basis of a spot position on the macrocell during the factory calibration procedure;

sensor elements with increasing distance from a center point (M) of the spot position receive a smaller weighting; and sensor elements outside the spot position receive a weighting of 0.

3. The reading device according to claim 1, wherein the weighting unit is configured to, based on the individually measured signal-to-noise ratios, assign a whole-number counting factor that is a power of two, wherein the generating the histogram comprises counting detections that correspond to a multiple of the respective counting factor of the sensor element, and rejecting other detections.

4. The reading device according to claim 1, wherein the multiple sensor elements are arranged substantially in a plane in matrix form.

5. The reading device according to claim 1, wherein
the summation unit is configured for generating the histogram on a basis of a multiple counting of detections according to the whole number weighting factors.

6. The reading device according to claim 1, wherein
the weighting unit is configured for the determining individual weighting parameters with whole number counting factors; and
the summation unit is configured for generating the histogram on a basis of an exclusive counting of detections which correspond to a multiple of the respective counting factor of the sensor element, and for rejecting the other detections.

7. The reading device according to claim 1, wherein
the weighting unit is configured for generating respectively a partial histogram for each sensor element; and the weighting unit is configured for determining the individual weighting parameters on a basis of an evaluation of the partial histograms; and the summation unit is configured for generating the histogram on a basis of a summation of the partial histograms weighted with the individual weighting parameters.

8. The reading device according to claim 1, wherein the lidar measuring device is configured for carrying out a Time Correlated Single Photon Counting, TCSPC, measuring method.

9. A lidar measuring device in focal plane array arrangement for the detecting of objects in an environment of a vehicle, comprising:

a lidar transmission unit with a plurality of transmission elements for the transmitting of light pulses and a lidar receiving unit with a plurality of sensor elements for receiving the light pulses, wherein the transmission elements and the sensor elements are arranged in lines which run parallel to a horizontal plane of the vehicle;

a reading device for determining a signal propagation time of the light pulses between the lidar transmission unit and the lidar receiving unit of the lidar measuring device, wherein the reading device includes:

an input interface for receiving detections from multiple sensor elements of the lidar receiving unit, said sensor elements being arranged in a macrocell paired with a transmission element of the lidar transmission unit;

a weighting unit for determining respectively an individual weighting parameter for each of the plurality of sensor elements, wherein the individual weighting parameter is generated during a factory calibration procedure that includes, for each sensor element: sequentially activating the sensor element while a constant signal propagation time is imposed, counting a number of detections registered by the sensor element, and assigning to the sensor element a whole-number weighting factor that is a power of two, proportional to a counted number of detections, and set to zero if the count is below a predetermined threshold, such that the weighting parameter depends on an individually measured signal-to-noise ratio of each sensor element;

a summation unit for generating a histogram with an allocation of the detections to detection times of the detections, wherein the summation unit is configured to weight the detections on a basis of the individual weighting parameters;

a propagation time unit for determining the signal propagation time on a basis of the generated histogram; and an output unit for outputting the signal propagation time.

10. The lidar measuring device according to claim 9, wherein the lidar measuring device is configured for arranging on the vehicle in a region of a bumper of the vehicle.

11. A method for determining a signal propagation time of a light pulse between a lidar transmission unit and a lidar receiving unit of a lidar measuring device in focal plane array arrangement, comprising:

determining a signal-to-noise ratio for each sensor element in a plurality of sensor elements in the lidar receiving unit, the plurality of sensor elements arranged in a macrocell allocated to a transmission element of the lidar transmission unit, wherein the determining comprises:

sequentially activating each sensor element in the plurality of sensor elements while a constant signal propagation time is imposed;

counting a number of detections registered by the sensor element; and assigning to the sensor element a whole-number weighting factor that is a power of two, proportional to a counted number of detections, and set to zero if the count is below a predetermined threshold, such that the weighting factor depends on an individually measured signal-to-noise ratio of each sensor element;

receiving (S10) detections of several sensor elements in the macrocell of the lidar receiving unit;

generating (S14) a histogram with an allocation of the detections to detection times of the detections;

weighing the detections on a basis of the individual weighting factors; and determining (S16) the signal propagation time on a basis of the generated histogram and outputting (S18) the signal propagation time.

12. A non-transitory computer program product with program code for carrying out the steps of the method according to claim 11, when the program code is executed on a computer.

13. The reading device according to claim 1, wherein the multiple sensor elements comprise single photon avalanche diodes.

14. The reading device according to claim 1, wherein the lidar transmission unit comprises at least one vertical cavity surface emitting laser.

15. The reading device according to claim 1, wherein the input interface is configured to receive detections from sensor elements arranged in lines that run parallel to a horizontal plane of a vehicle.

16. The lidar measuring device according to claim 9, wherein the device is configured to carry out a Time Correlated Single Photon Counting (TCSPC) measuring method.

17. The lidar measuring device according to claim 9, wherein the summation unit is configured to generate the histogram by multiple counting of detections according to the whole-number weighting factors assigned to each sensor element.

18. The method of claim 11, wherein the determining the signal-to-noise ratio for each sensor element comprises a factory calibration procedure.

19. The method according to claim 11, wherein the step of generating the histogram comprises generating a partial histogram for each sensor element, and summing the partial histograms with the individual weighting factors to produce a weighted overall histogram.

20. The method according to claim 11, further comprising, for each sensor element, assigning the whole-number counting factor that is a power of two and is determined based on the individually measured signal-to-noise ratio, wherein the generating the histogram comprises counting detections that correspond to a multiple of the respective counting factor of the sensor element, and rejecting other detections.

* * * * *